(12) United States Patent
Meadowcroft

(10) Patent No.: US 7,111,991 B2
(45) Date of Patent: Sep. 26, 2006

(54) OPTICAL ASSEMBLY AND METHOD FOR ALIGNMENT THEREOF

(75) Inventor: Simon Meadowcroft, Stowmarket (GB)

(73) Assignee: Avago Technologies General IP (Singapore) Ptd. Ltd., Singapore (SG)

(*) Notice: Subject to any disclaimer, the term of this patent is extended or adjusted under 35 U.S.C. 154(b) by 233 days.

(21) Appl. No.: 10/343,250

(22) PCT Filed: Jul. 25, 2001

(86) PCT No.: PCT/GB01/03337

§ 371 (c)(1), (2), (4) Date: Jan. 28, 2003

(87) PCT Pub. No.: WO02/10823

PCT Pub. Date: Feb. 7, 2002

(65) Prior Publication Data
US 2003/0152337 A1 Aug. 14, 2003

(30) Foreign Application Priority Data
Jul. 29, 2000 (GB) ................... 0018534.8

(51) Int. Cl.
*G02B 6/36* (2006.01)

(52) U.S. Cl. ........................ 385/88

(58) Field of Classification Search ............ 385/52, 385/88, 90–94, 79, 83, 38, 49
See application file for complete search history.

(56) References Cited

U.S. PATENT DOCUMENTS

| | | | |
|---|---|---|---|
| 5,095,517 A * | 3/1992 | Monguzzi et al. | 385/90 |
| 5,136,433 A | 8/1992 | Durell | 359/829 |
| 5,210,811 A | 5/1993 | Avelange et al. | 385/91 |
| 5,570,444 A * | 10/1996 | Janssen et al. | 385/90 |
| 5,854,869 A | 12/1998 | Joyce | 385/92 |
| 6,174,092 B1 * | 1/2001 | Siala | 385/91 |
| 6,190,056 B1 * | 2/2001 | Kwon et al. | 385/91 |
| 6,354,747 B1 * | 3/2002 | Irie et al. | 385/88 |
| 6,654,517 B1 * | 11/2003 | Fairchild et al. | 385/33 |
| 2001/0031117 A1 * | 10/2001 | Steinberg | 385/88 |

FOREIGN PATENT DOCUMENTS

FR 2 690 996 11/1993 ................. 385/136

* cited by examiner

Primary Examiner—Frank G Font
Assistant Examiner—Eric Wong

(57) ABSTRACT

An optical assembly for use in an optical telecommunications system and method for aligning the optical assembly. The assembly uses a pair of ball bearings to support an optical fibre on a baseplate. The optical fibre is aligned with respect to an optical device and then the first ball bearing is inserted and welded in place. The fibre alignment is then fine tuned and the second ball bearing is inserted and welded in place, thereby providing a simpler and more accurate method of aligning an optical fibre to an optical device.

8 Claims, 4 Drawing Sheets

OPTICAL ASSEMBLY AND METHOD FOR ALIGNMENT THEREOF

CROSS-REFERENCE TO RELATED APPLICATIONS

The present application is a national stage entry of International Application No. PCT/GB01/03337, filed Jul. 25, 1001, which claims priority of British Patent Application No. GB 0018534.8, filed Jul. 29, 2000.

FIELD OF THE INVENTION

The present invention relates to an optical assembly and a method for aligning the optical assembly. More specifically, the present invention relates to an optical assembly and method for aligning an optical fibre to an optical device for use within an optical telecommunications system.

DISCUSSION OF THE BACKGROUND

Current methods of aligning optical fibres to optical devices such as laser diodes and photo diodes are expensive and time consuming. In addition they do not provide the accuracy required for modern optical fibre applications such as is required in optical telecommunications systems.

The present invention overcomes these technical problems by providing a simpler optical assembly and method for aligning and fixing the optical assembly.

SUMMARY OF THE INVENTION

According to the present invention there is provided an optical assembly comprising an optical fibre mounted in a tube disposed in a first mount means having an angled surface, a baseplate, and a support member fixedly disposed between said angled surface and said baseplate.

The assembly may further comprise a second mounting means having an angled surface and a further support member fixedly disposed between said angled surface and said baseplate.

The support members are preferably ball bearings. The baseplate may include a groove in which the ball bearings are inserted and to which the ball bearings are subsequently fixed.

According to an alternative embodiment of the present invention, the optical assembly comprises an optical fibre mounted in a tube disposed in at least one mount means, a baseplate having at least one angled portion, and at least one support member fixedly disposed between said at least one mount means and said at least one angled portion of said baseplate.

Preferably, the optical assembly according to the present invention is used in an optical telecommunications system.

Advantageously, the present invention maintains alignment of the optical fibre to the optical device after the supporting members have been fixed to the fibre or to the first and second fibre mounting means and to the baseplate.

The method of fixing the ball bearings is preferably resistive welding. However, as will be appreciated, other suitable fixing means or methods could be used, such as laser welding.

The optical assembly may include a lens disposed between the optical fibre and the optical device. As will be appreciated, the optical assembly may include other optical elements, such as an optical isolator.

Advantageously, the present invention reduces or eliminates the need for tweaking the alignment of the optical fibre after fixing in order to re-establish maximum coupling efficiency between the optical fibre and the optical device.

The present invention also reduces or eliminates the chances of movement of the optical fibre during the fixing or welding process.

Advantageously, by using mount means with an angled surface all tolerances associated with the individual components of the optical assembly and their alignment with respect to each other are removed.

Once fixing has taken place, the present invention provides a continuous joint in which there are no fixing or weld gaps.

BRIEF DESCRIPTION OF THE DRAWINGS

While the principle advantages and features of the invention have been described above, a greater understanding and appreciation of the invention may be obtained by referring to the drawings and detailed description of the preferred embodiments, presented by way of example only, in which.

DETAILED DESCRIPTION OF THE PREFERRED EMBODIMENT

Figure 1:
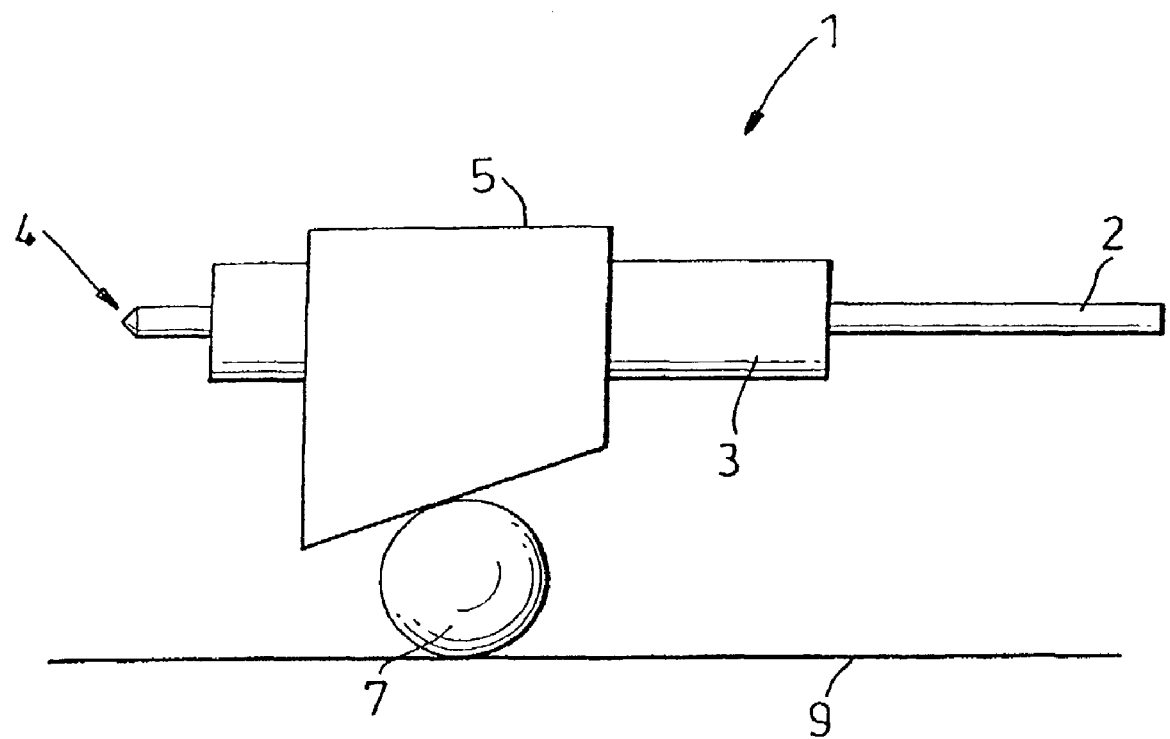
FIG. 1 is a side view of the optical assembly according to a first embodiment of the present invention.

In FIG. 1 the optical assembly 1 is shown comprising an optical fibre 2 mounted in a fibre tube 3. One end of the optical fibre 4 is aligned to an optical device (not shown). The fibre tube has a mount means 5 disposed around the fibre. Support member 7 is disposed between the mount means 5 and a baseplate 9. In this embodiment the support member is preferably a ball bearing. The ball bearing is fixed to the mount member and baseplate, preferably by resistive welding. However, as will be appreciated other fixing methods can be used, such as laser welding.

Figure 2:
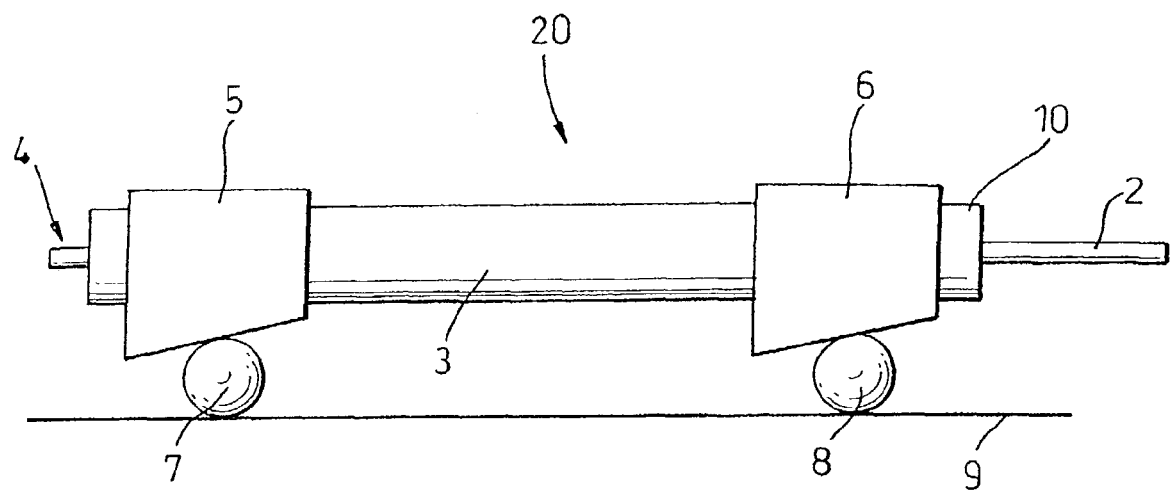
FIG. 2 is a side view of the optical assembly according to a second embodiment of the present invention.

In FIG. 2, where parts also appearing in FIG. 1 bear identical numerical designation, the optical assembly 20 is shown comprising an optical fibre 2 mounted in a fibre tube 3. One end of the optical fibre 4 is aligned to an optical device (not shown). The fibre tube has a mount means 5 disposed proximate the optical device and a further mount means 6 disposed at the opposite end of the fibre tube. Support members 7 and 8 are disposed between the mount means 5 and 6 respectively and a baseplate 9. As in the previous embodiment, the support members are preferably ball bearings. The ball bearings are fixed to the mount members and baseplate, preferably by resistive welding.

Accurate alignment of end 4 of the fibre to an optical device is achieved as follows. Rough alignment of end 4 of the fibre to the optical device is done using conventional micro alignment equipment. Then the first ball bearing 7 is inserted between the fibre mount means 5 and welded in place. Next accurate alignment of the fibre to the optical device is achieved by manipulating the distal end 10 of the fibre using conventional micropositioning equipment. As is known in the art, optimum alignment is determined by powering the optical device and monitoring the output from the distal end of the fibre. Once optimum alignment is detected, the second ball bearing 8 is inserted between the second mount means 6 and the baseplate 9 and welded in place.

Figure 3:
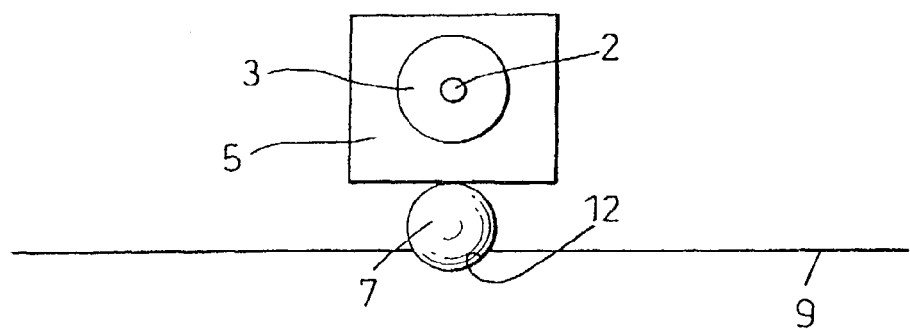
FIG. 3 is an end view the optical assembly shown in either FIG. 1 or 2 and includes a groove in the baseplate.

In FIG. 3, where parts also appearing in FIGS. 1 and 2 bear identical numerical designation, baseplate 9 is shown comprising a groove 12. Advantageously, the groove allows for the ball bearings to be rolled into place prior to welding.

Figure 4:
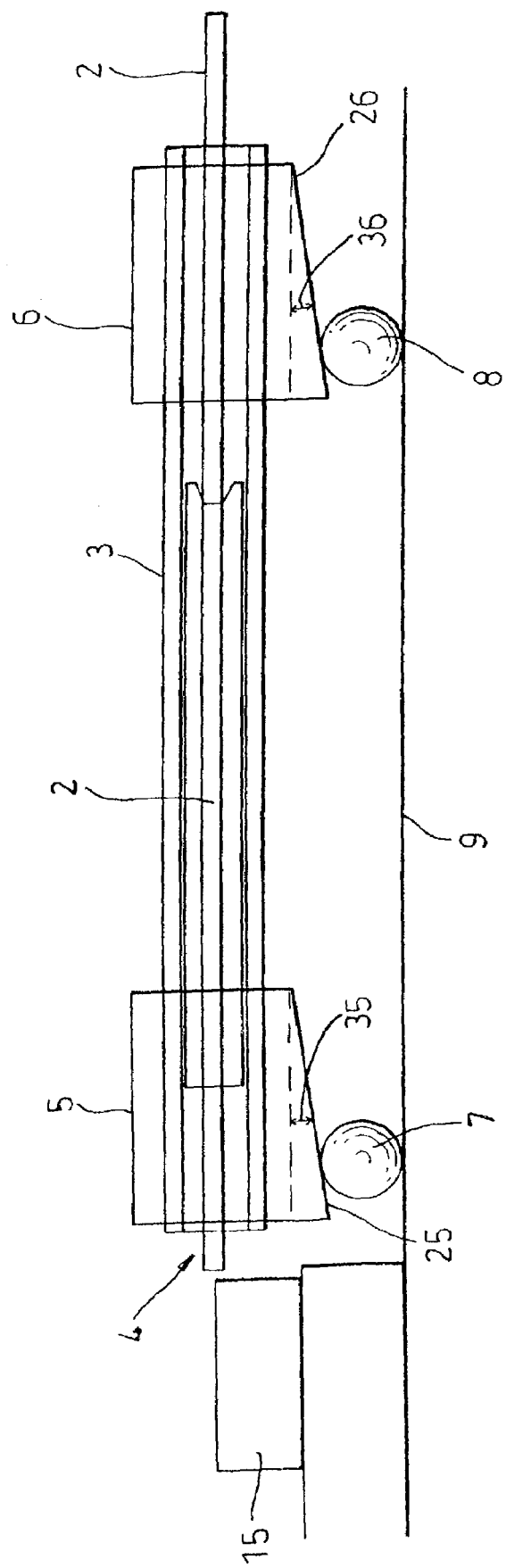
FIG. 4 is a more detailed diagram of the optical assembly shown in FIG. 2.

In FIG. 4, in which parts also appearing in FIGS. 1–3 bear identical numerical designation, an optical device 15 is located at end 4 of the optical fibre. As clearly seen in FIG. 4, the lower surfaces 25 and 26 of mount means 5 and 6 respectively are angled with respect to the baseplate. Angles 35, 36 enable the ball bearings 7, 8 to be rolled into place along the groove 12 and stop when contact is made with the mount means 5, 6. These angles enable a variety of alignment positions to be accommodated for using the same pieceparts. The presence of the angled lower surfaces on the mount means significantly improves the flexibility and ease of use of this present invention.

Figure 5:
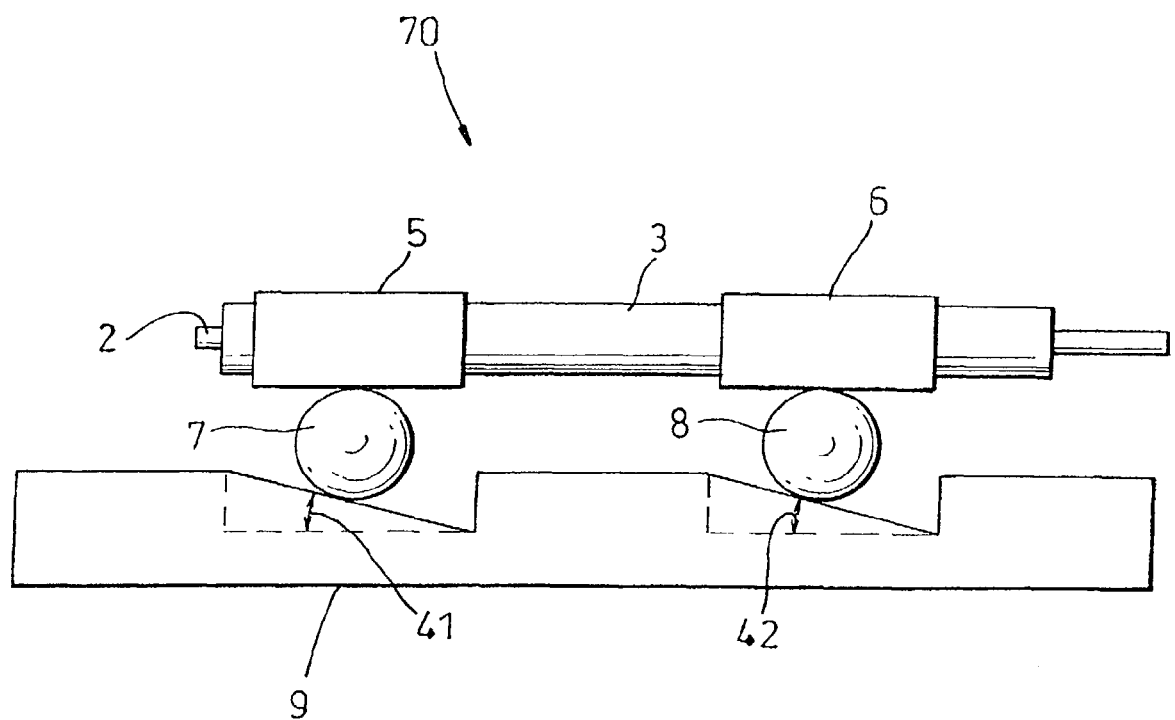
FIG. 5 shows yet a further alternative embodiment of the present invention.

In FIG. 5, where parts also appearing in the previous figures bear identical numerical designation, the optical assembly 70 has a baseplate 9 which is arranged to include angled portions 41, 42. These angled portions function in the same way as angles 35 and 36 shown in FIG. 4 above. However, instead of being located on the lower surface of mount means the angels are disposed in the baseplate.

It is not intended that the present invention be limited to the above embodiments and other modifications and variations are envisaged within the scope of the claims.

The invention claimed is:

1. An optical assembly comprising:
   a mount having a first surface;
   an optical fibre mounted in a tube disposed in said mount;
   a baseplate having a second surface in a non-parallel arrangement with respect to said first surface, to provide an angled region between said first and second surfaces; and
   a ball bearing fixedly disposed in said angled region, between said first and second surfaces, and having an outer surface in contact with said first and second surfaces.

2. An optical assembly as claimed in claim 1,
   wherein said mount is a first mount and said ball bearing is a first ball bearing and said angled region is a first angled region, and
   wherein said optical assembly further comprises:
      a second mount having a third surface in a non-parallel arrangement with respect to said second surface, to provide a second angled region between said second and third surfaces; and
      a second ball bearing fixedly disposed in said second angled region, in contact with said second and third surfaces.

3. An optical assembly as claimed in claim 1,
   wherein said baseplate includes a groove, and
   wherein said ball bearing is situated in said groove.

4. An optical telecommunications system using an optical assembly comprising:
   a mount having a first surface;
   an optical fibre mounted in a tube disposed in said mount;
   a baseplate having a second surface in a non-parallel arrangement with respect to said first surface, to provide an angled region between said first and second surfaces; and
   a ball bearing fixedly disposed in said angled region, between said first and second surfaces, and having an outer surface in contact with said first and second surfaces.

5. The optical assembly of claim 1, wherein said ball bearing is fixed to said first and second surfaces to fix a physical position of said optical fibre.

6. The optical telecommunications system of claim 4, wherein said ball bearing is fixed to said first and second surfaces to fix a physical position of said optical fibre.

7. An optical assembly comprising:
   a mount having a first surface;
   an optical fibre in a tube in said mount;
   a baseplate having a second surface; and
   a ball bearing,
   wherein said first surface and said second surface are situated with respect to one another to provide a wedge-shaped region between said first and second surfaces, and
   wherein said ball bearing is situated in said wedge-shaped region and fixed to said first surface and said second surface.

8. The optical assembly of claim 7, wherein said ball bearing fixes a position of said first surface with respect to said second surface.

* * * * *